United States Patent
Ge et al.

(10) Patent No.: US 8,171,048 B2
(45) Date of Patent: *May 1, 2012

(54) RANKING DOCUMENTS BASED ON A LOCATION SENSITIVITY FACTOR

(75) Inventors: Xianping Ge, Sunnyvale, CA (US);
Abhishek Parmar, San Jose, CA (US);
Amit Singhal, Palo Alto, CA (US);
Adam Smith, Mountain View, CA (US);
Daniel Egnor, New York, NY (US);
Elizabeth Hamon, Mamaroneck, NY (US)

(73) Assignee: Google Inc., Mountain View, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 12/551,319

(22) Filed: Aug. 31, 2009

(65) Prior Publication Data

US 2009/0327286 A1    Dec. 31, 2009

Related U.S. Application Data (63) Continuation of application No. 10/748,656, filed on Dec. 31, 2003, now Pat. No. 7,606,798.

(60) Provisional application No. 60/505,095, filed on Sep. 22, 2003.

(51) Int. Cl.
*G06F 17/30* (2006.01)

(52) U.S. Cl. ........................................................ 707/771

(58) Field of Classification Search .................. 707/736, 707/737, 738, 713, 748, 749, 769, 758, 771
See application file for complete search history.

(56) References Cited

U.S. PATENT DOCUMENTS

| | | | |
|---|---|---|---|
| 6,285,999 B1 | 9/2001 | Page | |
| 6,377,961 B1 | 4/2002 | Ryu | |
| 6,418,434 B1 | 7/2002 | Johnson et al. | |
| 7,188,106 B2* | 3/2007 | Dwork et al. | 1/1 |
| 2001/0034660 A1 | 10/2001 | Heumann | |
| 2002/0007336 A1 | 1/2002 | Robbins | |
| 2002/0049742 A1 | 4/2002 | Chan et al. | |
| 2002/0087522 A1 | 7/2002 | MacGregor et al. | |
| 2003/0061211 A1* | 3/2003 | Shultz et al. | 707/3 |
| 2003/0069877 A1 | 4/2003 | Grefenstette et al. | |
| 2003/0074353 A1 | 4/2003 | Berkan et al. | |
| 2003/0078924 A1 | 4/2003 | Liechty et al. | |

(Continued)

FOREIGN PATENT DOCUMENTS

GB    2365549 A    2/2002

(Continued)

OTHER PUBLICATIONS

Claims of co-pending U.S. Appl. No. 10/665,359, filed Sep. 22, 2003 titled "Determining Geographical Relevance of Web Documents," Maureen Heymans et al., 10 pages.

(Continued)

*Primary Examiner* — Angela Lie (74) *Attorney, Agent, or Firm* — Harrity & Harrity, LLP (57) ABSTRACT

Systems and methods improve search rankings for a search query by using location data associated with queries and documents related to the search query. In one aspect, a search query is received, a location score is determined, a topical score is determined, and an ordering of documents related to the search query is determined based, at least in part, on the location score and the topical score.

21 Claims, 2 Drawing Sheets

U.S. PATENT DOCUMENTS

| | | |
|---|---|---|
| 2004/0078750 A1 | 4/2004 | Frank |
| 2004/0193595 A1 | 9/2004 | Kaminsky et al. |
| 2005/0027591 A9 | 2/2005 | Gailey et al. |

FOREIGN PATENT DOCUMENTS

| | | |
|---|---|---|
| WO | WO 00/77689 A1 | 12/2000 |
| WO | WO 02/065331 A2 | 8/2002 |
| WO | WO 02/102025 A1 | 12/2002 |

OTHER PUBLICATIONS

Sergey Brin et al.: "The Anatomy of a Large-Scale Hypertextual Web Search Engine," 20 pages, 1998.

Citysearch, http://www.citysearch.com, 3 pages, Dec. 24, 2003 (print date).

Yahoo! Yellow Pages, http://yp.yahoo.com, 3 pages, Dec. 24, 2003 (print date).

Northern Light Search, http://web.archive.org/web/20001202100700/http://northernlight.com/index.html, Dec. 2000, 4 pages.

D. Sullivan: "The Search Engine Report," May 3, 2000—No. 42, http://www.searchenginewatch.com/sereport/article.php/2207551, 17 pages.

Co-pending U.S. Appl. No. 10/314,427, filed Dec. 6, 2002, titled "Methods and Apparatus for Serving Relevant Advertisements," Jeffrey A. Dean et al.; 30 pages.

Co-pending U.S. Appl. No. 10/375,900, filed Feb. 26, 2003, titled "Serving Advertisements Based on Content," Darrell Anderson et al.; 59 pages.

Co-pending U.S. Appl. No. 10/389,688, filed Mar. 14, 2003, titled "Suggesting and/or Providing Ad Serving Constraint Information," Jeffrey Dean et al.; 30 pages.

Co-pending U.S. Appl. No. 10/445,376, filed May 23, 2003, titled "Scoring, Modifying Scores of, and/or Filtering Advertisements Using Advertiser Information," Jane Manning et al.; 37 pages.

International Search Report dated Feb. 2, 2005, 4 pages.

Chi-Hung Chi et al., "Study for Fusion of Different Sources to Determine Relevance," Proceedings of the 14$^{th}$ IEEE International Conference on Tools with Artificial Intelligence, Nov. 4-6, 2002, 6 pages.

\* cited by examiner

RANKING DOCUMENTS BASED ON A LOCATION SENSITIVITY FACTOR

RELATED APPLICATION

This application is a continuation of U.S. patent application Ser. No. 10/748,656, filed Dec. 31, 2003, which claims priority under 35 U.S.C. §119 based on U.S. Provisional Application No. 60/505,095, filed Sep. 22, 2003, the disclosures of which are incorporated herein by reference.

FIELD OF THE INVENTION

The invention generally relates to information retrieval systems. More particularly, the invention relates to methods and systems for improving a search ranking using location awareness.

BACKGROUND OF THE INVENTION

The World Wide Web ("web") contains a vast amount of information. Locating a desired portion of the information, however, can be challenging. This problem is compounded because the amount of information on the web and the number of new users inexperienced at web searching are growing rapidly.

Existing search engines operating in a networked computer environment, such as the web or in an individual computer, can provide search results in response to entry of a user's search query. In many instances, the search results are ranked in accordance with the search engine's scoring or ranking system or method. For example, existing search engines score or rank documents of a search result for a particular query based on the contents of the documents, such as on the number of times a keyword or particular word or phrase appears in each document in the search results. Documents include, but are not limited to, for example, web pages of various formats, such as HTML, XML, XHTML; Portable Document Format (PDF) files; word processor and application program document files, electronic mail, audio/video/multimedia files, advertisements (of numerous formats and media types), etc.

Other search engines base scoring or ranking on more than the content of the document. For example, one known method, described in U.S. Pat. No. 6,285,999 issued to Page and an article entitled "The Anatomy of a Large-Scale Hypertextual Search Engine," by Sergey Brin and Lawrence Page (each of which is incorporated herein by reference), assigns a degree of importance to a document, such as a web page, based on the link structure of the web page. Other conventional methods involve selling a higher score or rank in search results for a particular query to third parties that want to attract users or customers to their web sites.

Some documents may be of particular interest to users that reside in or are interested in certain geographical areas. For example, documents associated with an on-line newspaper may be of most relevance to the geographical area covered by the newspaper. Documents associated with local businesses or organizations are additional examples of documents that may be of particular interest to a geographical area. Thus, it can be desirable for a search engine to know whether a document has geographical significance and return documents that are in proximity to the user.

One known approach to returning business listings that are proximate to a searcher is provided by online "yellow pages" services, such as those offered by Yahoo! Inc. and Citysearch.com. When using these yellow pages services, a user specifies a location, typically by entering an address, city/state, or zip code. The user then submits a search query, and a list of business listings is provided in response. Each business listing may include listing information, such as the business name, address, telephone number, business category, etc. In addition, the online search provider determines a distance between the business listings and the user location. The returned business listings are presented to the user in their order of distance from the user location.

Another known technique for providing a primitive form of geographic-based searching is the service previously offered by the search engine Northern Light. When using this service, users specify a location by entering information (such as street address, city and state, zip code) into a "where" field. Users also specify a search query via a "what" field. Finally, users specify a distance radius via a "how far" drop-down menu. The user-specified distance is used to restrict, or filter, the set of results otherwise returned by the search query, so that only those results with a location within the specified radius from the user location is presented.

One problem with known techniques for providing geographically-based search results is that the most relevant search results, taking into account both location and non-location factors, are often not returned to the user. Another problem is that the best results, even when presented, are not ranked highest in the search results and, therefore, may be obscured by less relevant results. This occurs because existing techniques omit the most relevant search results if the location of the result is not within the user defined radius of search (e.g., in the Northern Light example above), or are included with and/or ranked lower than other less relevant search results that have locations closer to the user (e.g., in the yellow pages example above). Other shortcomings in existing techniques include the need for users to explicitly define a radius of interest, and the need to manually enlarge the radius to find more relevant results that were not returned, or page through many pages of less relevant but geographically proximate results to find the most relevant result.

Accordingly, there is a need in the art to be able to provide the most relevant documents considering both geographic and non-geographic relevance and to, therefore, provide users with quick access to better search results.

SUMMARY

According to one aspect consistent with the principles of the invention, a method for ordering documents is provided. The method may include receiving a search query, determining a location associated with the query, and determining topical scores for a group of documents based, at least in part, on the query. The method may also include selecting a set of documents from the group of documents, determining a distance score for each document in the set of documents using a document location associated with the document and the location associated with the query, and ordering the set of documents as a function of both the topical scores of the set of documents and the distance scores of the set of documents.

According to another aspect, a method for ranking documents is provided. The method may include receiving a search query, identifying a topic relating to the search query, and determining a location sensitivity of the identified topic. The method may also include identifying a set of documents based, at least in part, on the search query, determining a location associated with at least one document in the set of documents, and ranking the at least one document in the set of documents based, at least in part, on the location associated with the at least one document when the identified topic is determined to be location sensitive.

According to yet another aspect, a system for presenting advertisements relevant to a target document is provided. The system may include means for identifying a topic for the target document and means for identifying a location associated with the target document. The system may also include means for identifying targeting information for a group of advertisements and means for identifying a set of potential advertisements based, at least in part, on the targeting information and the topic for the target document. The system may further include means for determining a distance score for at least one advertisement in the set of potential advertisements using an advertiser location associated with the at least one advertisement and the location associated with the target document, means for ranking the set of potential advertisements based, at least in part, on the distance score of the at least one advertisement, and means for presenting at least one of the ranked set of potential advertisements in association with the target document.

BRIEF DESCRIPTION OF THE DRAWINGS

These and other features, aspects, and advantages of the invention are better understood when the following Detailed Description is read with reference to the accompanying drawings, wherein.

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention may improve search ranking by using location information.

Figure 1:
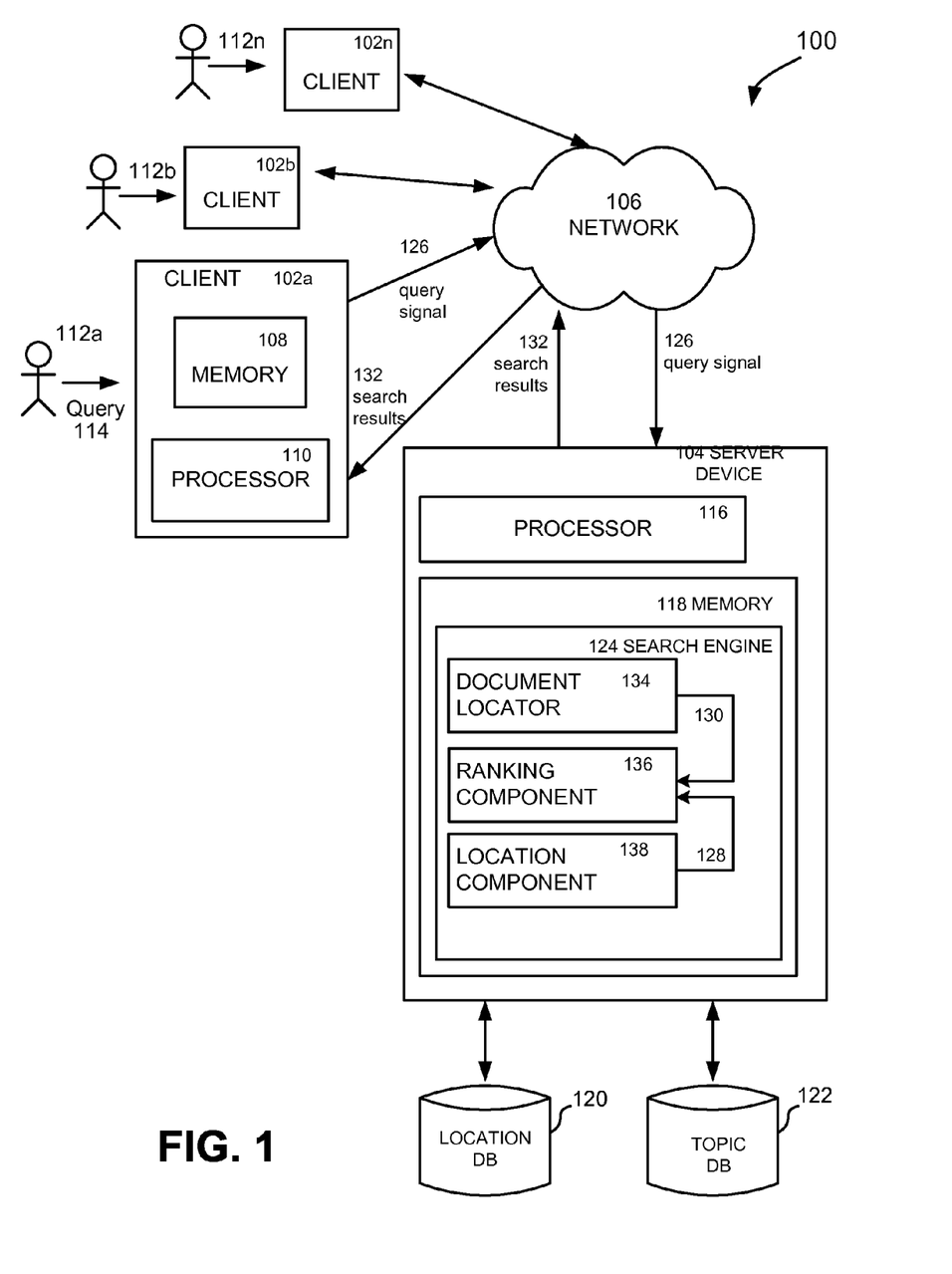
FIG. 1 illustrates a block diagram of a system in which systems and methods consistent with the principles of the invention may be implemented.

FIG. 1 is a block diagram of an exemplary system 100 in which systems and methods consistent with the principles of the invention may be implemented. The system 100 shown in FIG. 1 includes multiple client devices 102a-n, a server device 104, and a network 106. The network 106 may include the Internet. Alternatively, network 106 may include one or more memory devices. In this case, client devices 102a-n and server device 104 may operate in a single computer.

The client devices 102a-n may each include a computer-readable memory 108, such as a random access memory (RAM), coupled to a processor 110. The processor 110 executes a set of computer-executable program instructions stored in memory 108. The processor 110 may include a microprocessor, an application-specific integrated circuit (ASIC), and/or a state machine. The processor 110 may include, or may be in communication with, media, for example computer-readable media, that stores instructions that, when executed by the processor 110, cause the processor 110 to perform functions described herein. In one implementation, this computer-readable media includes memory 108.

Implementations of computer-readable media include, but are not limited to, an electronic, optical, magnetic, or another storage or transmission device capable of providing a processor with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or another transmission device or channel, both wired and wireless. The instructions may comprise code from any computer-programming language, including, for example, C, C++, C#, Visual Basic, Java, and JavaScript.

Client devices 102a-n may also include a number of external or internal devices such as a mouse, a CD-ROM, a keyboard, a display, or other input or output devices. Examples of client devices 102a-n include personal computers, digital assistants, personal digital assistants, cellular phones, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a browser application program, such as Internet Explorer™ from Microsoft Corporation, Netscape Navigator™ from Netscape Communications Corporation, and/or Safari™ from Apple Computer. Through the client devices 102a-n, users 112a-n can communicate over the network 106 with each other and with other systems and devices coupled to the network 106.

As shown in FIG. 1, a server device 104 is also coupled to the network 106. In the implementation shown, a user 112a-n can generate a search query 114 at a client device 102a-n to transmit to the server device 104 via the network 106. For example, a user 112a types a textual search query into a query field of a web page of a search engine displayed on the client device 102a, which is then transmitted via the network 106 to the server device 104. In the implementation shown, a user 112a-n inputs a search query 114 at a client device 102a-n which transmits an associated search query signal 126 reflecting the search query 114 to the server device 104.

The server device 104 may include a server executing a search engine application program such as the Google™ search engine. Similar to the client devices 102a-n, the server device 104 may include a processor 116 coupled to a computer-readable memory 118. Server device 104, depicted as a single computer system, may be implemented as a network of computer processors. Examples of server devices 104 include servers, mainframe computers, networked computers, a processor-based device and similar types of systems and devices. Client processors 110 and the server processor 116 can be any of a number of well known computer processors, such as processors from Intel Corporation, Motorola Corporation, and Advanced Micro Devices.

Memory 118 may include the search engine application program, also known as a search engine 124. The search engine 124 locates relevant information in response to a search query 114 from a user 112a-n.

The server device 104, or a related device, may search the network 106 to locate articles, such as web pages, stored at other devices or systems connected to the network 106, and index the articles in memory 118 or another data storage device. Articles include, documents, for example, web pages of various formats, such as HTML, XML, XHTML, PDF files, and word processor, database, and application program document files, audio, video, or any other information of any type whatsoever made available on a network (such as the Internet), a personal computer, or other computing or storage devices. The implementations described herein are described generally in relation to documents, but implementations may operate on any type of article.

The search engine 124 responds to the associated search query signal 126 reflecting the search query 114 by returning a set of relevant information or search results 132 to client device 102*a-n* from which the search query 114 originated.

The search engine 124 may include a document locator 134, a ranking component 136, and a location component 138. In the implementation shown, each may comprise computer code residing in the memory 118. The document locator 134 may identify a set of documents 130 that are responsive to the search query 114 from a user 112*a*. In the implementation shown, this is accomplished by accessing an index of documents, indexed in accordance with potential search queries or search terms. The ranking component 136 may rank or score the documents 130 that include the set of web pages or documents located based upon relevance to a search query 114 and/or any other criteria. The location component 138 may determine or otherwise measure a quality signal, such as a distance signal 128 that reflects or otherwise corresponds to the geographic relevance of one or more web pages or documents in the located set of the documents 130. Note that other functions and characteristics of the document locator 134, ranking component 136, and location component 138 are further described below.

Server device 104 also provides access to other storage elements, such as a location data storage element (in the example shown as location database 120) and a location sensitivity data storage element (in the example shown as topic database 122). The specific location sensitivity database shown is a topic database, but any location sensitivity data storage element may be used, such as a user database, a profile database, a query database, a keyword database, etc. Data storage elements may include any one or combination of methods for storing data, including without limitation, arrays, hash tables, lists, and pairs. Other similar types of data storage devices can be accessed by the server device 104. The location database 120 stores geographic or location data associated with documents and/or users. The search engine 124 determines relationships or otherwise executes a set of instructions to determine relationships between topics and their geographic or location sensitivity, and stores relationship-type data in the topic database 122. Alternatively, the location component 138 determines relationships or otherwise executes a set of instructions to determine relationships between topics and their geographic or location sensitivity, and stores relationship-type data in the topic database 122.

It should be noted that implementations consistent with the principles of the invention may include systems having a different architecture than that which is shown in FIG. 1. For example, in some alternative systems, the location database 120, topic database 122 and location component 138 may not be part of the search engine 124, and may carry out operations offline. Also, in other implementations, the location component 138 may affect the output of the document locator 134 or another component or system. The system 100 shown in FIG. 1 is merely exemplary, and is used to explain the exemplary processing described below with respect to FIG. 2.

In the exemplary implementation shown in FIG. 1, the topic database 122 contains data gathered and stored prior to carrying out the exemplary processing that will be described with respect to FIG. 2. Still referring to FIG. 1, the location component 138 may determine a relationship between a topic and its location sensitivity. For example, location component 138 may analyze the query to determine a keyword, or a query topic. Furthermore, it may determine the amount or extent to which geographically-based search results are relevant to the topic and a relevant geographic range for the topic, for example, by examining user behavior (e.g., user selection behavior, such as mouseover or click through) of search results 132 presented to the user.

For example, when a user 112*a* types in search queries, such as "infinity auto" and "pizza," location component 138 may determine associated topics of "car/automobile" and "restaurant." This determination may be made in any number of ways known in the art and is, therefore, not described further. Location component 138 may further determine the sensitivity of the topics "car/automobile" and "restaurant" to location-based search results. For example, location component 138 may determine that users are generally more location sensitive for the topic "pizza" than for the topic "automobiles/cars," so that users may generally be interested in documents on the topic of "automobiles/cars" that are far (ther) away from their location, whereas users may generally only be interested in documents on the topic of "pizza" that are near(er) to their location. Location sensitivity can be determined relatively, or in one implementation can also be mapped to a distance (e.g., users are generally interested in documents with a distance of up to 50 miles for "automobiles/cars," but only 5 miles for "pizza").

Location component 138 may employ various techniques to determine sensitivity. In one implementation, location component 138 may analyze user selection behavior (such as user click through, stay time, mouseover, conversion data, etc.) with respect to certain search results based in part on geographic relevance, as compared to other search results both with and without estimated geographic relevance. As described in more detail below, in certain implementations consistent with the invention, location sensitivity may be used to affect the output of search engine 124, including ranking component 136, document locator 134, and/or location component 138. Other types of relationships or proximities can be defined according to implementations consistent with the invention and stored by the topic database 122.

In one implementation, the location database 120 may store address/map data associated with users, queries, and/or documents stored by the server device 104. Note that in certain implementations, locations associated with documents may be stored and indexed when search engine 124 performs a search of the network 106 to locate articles, such as web pages, and may be stored with the articles in memory 118. Location database 120 may be consulted to determine a location associated with a user or a document, such as when calculating a distance between a user location and a document location (as described further below).

Various methods in accordance with the principles of the invention may be carried out. One exemplary method consistent with the principles of the invention comprises receiving a search query, determining a location associated with the search query, determining topical scores for a set of documents based, at least in part, on the search query, selecting documents from the set of documents to be presented, determining a distance score for each of the selected documents using a document location associated with the document and the location associated with the query, and ordering (or ranking or arranging) the selected documents as a function of both the topical scores of the documents and the distance scores of the documents.

In some implementations, a ranking score for a document is determined. This may be accomplished in any fashion. For example, a mathematical function or algorithm may be used. One or more variables may be used in the function, including those associated with distances between a document location and a location associated with the query. One example of determining a ranking score for a document includes determining an initial ranking score for the document when associated with the search query, and calculating a mathematical function including the initial ranking score and the distance score. This mathematical function may be any of a variety of functions or algorithms. One such function includes combining the initial ranking score and the distance score, possibly weighted with at least one weighting factor. Other such functions include combining the initial ranking score and the distance score, possibly normalized with at least one normalization factor. Again, these are only examples, and a variety of formulations are possible, as would be understood by those of skill in the art.

Figure 2:
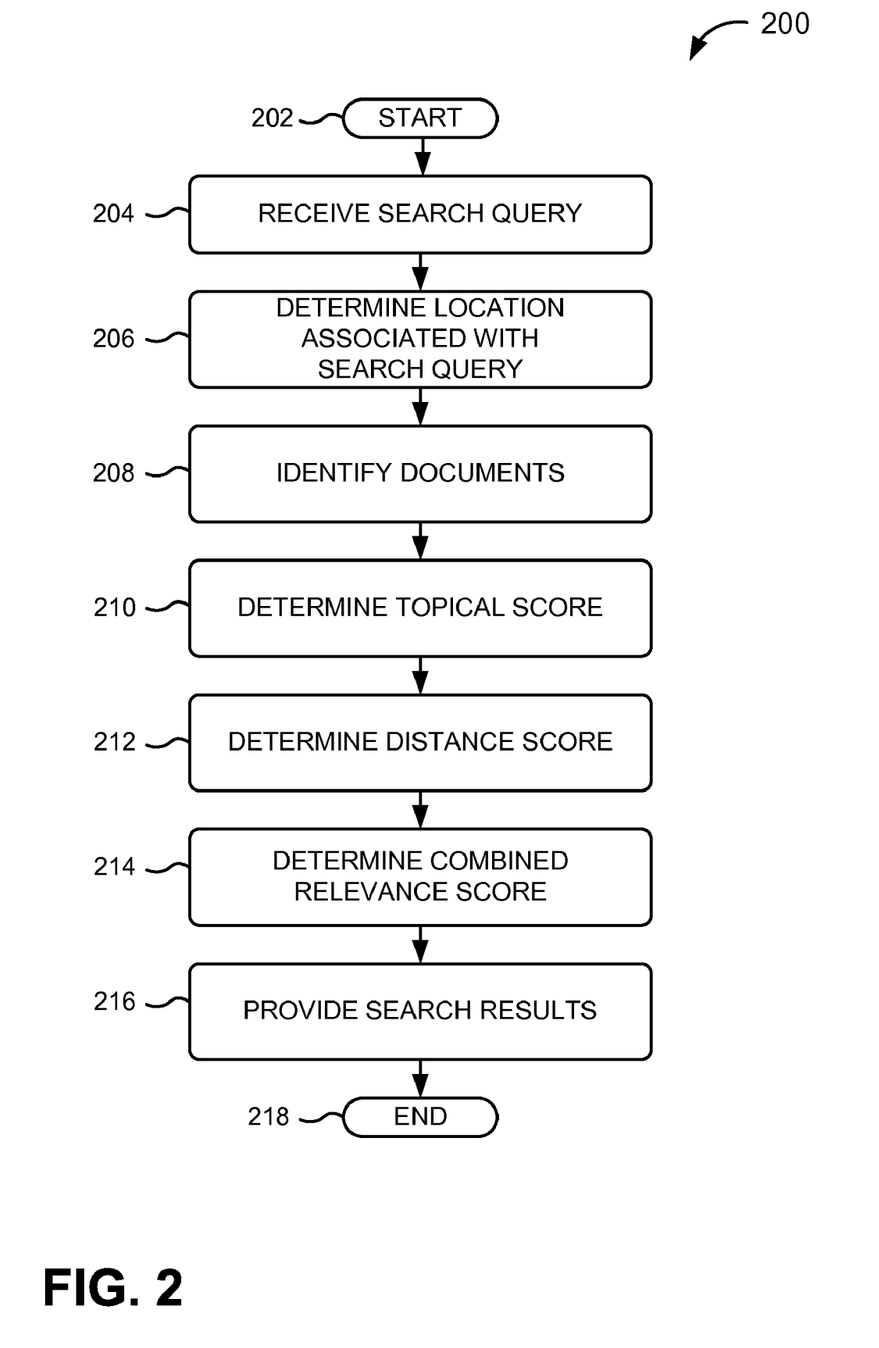
FIG. 2 illustrates a flow diagram of a method in accordance with one implementation consistent with the principles of the invention.

FIG. 2 illustrates an exemplary method 200 consistent with the principles of the invention. This exemplary method is provided by way of example, as there are a variety of ways to carry out methods consistent with the invention. The method 200 shown in FIG. 2 can be executed or otherwise performed by any of various systems. The method 200 is described below as carried out by the system 100 shown in FIG. 1 by way of example. The method 200 shown provides an improvement of a search ranking using geographic relevance.

Each block shown in FIG. 2 represents one or more steps carried out in the exemplary method 200. Additional steps may be added and/or steps may be omitted or changed, and steps need not be performed in the order shown. Referring to FIG. 2, in block 202, the example method 200 begins. Block 202 is followed by block 204, in which a search query, in the form of a search query signal, is received by the server device 104. In the implementation shown, a user 112a generates a search query 114 at a client device 102a. The client device 102a transmits an associated search query signal 126 reflecting the search query 114 to the server device 104 via a network 106. The search engine 124 receives the search query signal 126 and processes the search query 114. For example, if the user 112a types a search query "pizza palo alto" into the search or query field of a search page on a browser application program, the client 102a transmits a search query signal 126 that includes the text "pizza palo alto" or some other representation or indication of "pizza palo alto." The search engine 124 receives the signal 126 and determines that "pizza palo alto" is the desired search query 114.

Block 204 is followed by block 206, in which one or more locations associated with the search query 114 are determined. This may be accomplished, for example, by the user specifying location information explicitly, by examining a cookie or other user profile or account information, by inferring or implying location information based, at least in part, on the user's network address, browsing history, search history (including the query being served, e.g., "palo alto" from the query "pizza palo alto"), and/or by consulting location database 120. Other techniques for determining location information are disclosed in U.S. patent application Ser. No. 10/665,359, entitled "DETERMINING GEOGRAPHICAL RELEVANCE OF WEB DOCUMENTS," filed Sep. 22, 2003, which is hereby incorporated herein by reference.

Block 206 is followed by block 208, in which documents are identified. In this block 208 in the implementation shown, the search engine 124 may conduct a search for relevant documents in a search database (not shown) or memory 118 that have previously been indexed from the network 106. The search engine 124 may receive document data from the search database or memory 118 in response to the search query signal 126 reflecting the search query 114 from the user 112a. Document data can include, but is not limited to, a universal resource locator (URL) that provides a link to a document, web page, or to a location from which a document or web page can be retrieved or otherwise accessed by the user 112a via the network 106, data indicating one or more locations with which documents are associated, and data corresponding to the text of the documents. Note that document data may sometimes be referred to as a "document" throughout the description herein. Alternatively, the search engine 124 may obtain or otherwise receive document data in other ways.

For example, in block 208, the search engine 124 may identify documents responsive to the search query "pizza palo alto." For example, these documents may include a list of 100 documents that are related to "pizza" or "palo alto" (or both). In this implementation, the identification of documents may be performed by a conventional search engine query and results return.

Block 208 is followed by block 210, in which a topical score is determined. In the implementation shown, a topical relevance score for each of the identified documents is determined. By topical score, it should be understood that various information retrieval and other techniques used by conventional search engines to determine the relevance of a document may be employed. For example, in a web search, one can use text information, link information and link structure, personalized information, etc. In particular, topical score refers to a score generated from various sources and signals other than location information. In one implementation, the topical score increases with relevance (i.e., it is an increasing function of relevance), such that a less relevant result according to the topical score factors corresponds to a lower or equal topical score.

Block 210 is followed by block 212, in which a distance score is determined. For example, in one implementation, one or more locations associated with each of the identified documents is determined, and a distance score is calculated for each document based, at least in part, on the distance between the location(s) associated with the document and the location associated with the search query. The distance score can be a distance measure, such as, for example, the straight-line distance between a document location and the search query location, or the driving distance or estimated driving time from the search query location to the document location along established roadways. The distance score may involve various weights and factors (as one example, weighting and normalization may be used when a document is associated with multiple locations). As will be appreciated by those of skill in the art, numerous methods and factors may be included in a distance score. In one implementation, the distance score F is a decreasing function of a distance measure, such that if d is the distance measure, $F(d_2) \leq F(d_1)$ when $d_2 > d_1$. In one implementation, the distance score is a continuous and monotonic function of a distance measure. In a further implementation, the distance score is a continuous, smooth and strictly monotonic function (i.e., monotonically increasing or monotonically decreasing) of a distance measure.

Block 212 is followed by block 214, in which a combined relevance score is determined. In one implementation, the topical scores and distance scores are merged to yield a combined score. For example, the topical score and distance score of each of the identified documents may be joined to determine a combined relevance score for the document. In one implementation in which the topical score R is an increasing function of relevance and the distance score F is a decreasing function of a distance measure d, the combined relevance score C=C(R, F(d)) is an increasing function of R and an increasing function of F(d). For example, the functions F and C may be of the following form:

$$F(d) = \frac{\alpha}{\beta + d}$$

$$C(R, F) = \kappa * R + \lambda F(d),$$

where α, β, κ, λ are appropriate constants or weighting factors. The weighting factors may vary based, at least in part, on the search query, such as a topic associated with the search query and/or a keyword associated with the search query. In general, there may be numerous formulations of combined relevance score C using topical score R and distance score F. In one implementation, C is a continuous, smooth and strictly monotonic function of both R and F.

In one embodiment of the invention, because the combined relevance score C considers both the topical score R and the distance score F of a document, it may be possible that the ordering of documents according to combined relevance scores C yields a different order than if the documents are ordered according to topical scores R or according to distance scores F. For example, consider three documents: document A, document B, and document C. Assume that document A has a topical score R1, a distance score F1, and a corresponding relevance score C1; document B has a topical score R2 (where R2>R1), a distance score F2 (where F2<F1), and a corresponding relevance score C2; and document C has a topical score R3 (R3>R1), a distance score F3 (where F3<F1), and a corresponding relevance score C3. Because the combined relevance score is a function of both the topical score and the distance score, it may be possible for the combined relevance score C2 to be greater than the combined relevance score C1 and the combined relevance score C1 to be greater than the combined relevance score C3, or vice versa.

As previously mentioned, different topics, queries, users, geographic locales, etc. may have different location sensitivity. For example, a topic, such as "plumbers," may be strongly associated with local documents or web pages (high location sensitivity), whereas a topic like "travel destinations" may be less location sensitive. Certain query types (e.g., commercial queries) may have different location sensitivity. Similarly, some users may specify a more local focus for their desired search results than other users, or may be determined to have a more local focus based, at least in part, on browsing history, search history, or transactional or other kinds of available data. One location, such as Manhattan, N.Y., might be more location sensitive compared to another geographic area, such as Camas County, Idaho (the most sparsely populated county in Idaho).

The specificity of a location term provided or inferred (e.g., a location specified by a user or a search query), such as a zip code versus a city versus a street address, may affect location sensitivity, as would information, such as a user specified maximum distance ("I'm willing to travel 30 miles to . . . . "). For a decreasing distance score function F, it may be desirable to adjust the rate at which F decreases as a function of distance based, at least in part, on location sensitivity. Thus, one reformulation of the distance score F given above might be:

$$F(d, S) = \frac{\alpha}{\beta + S \times d},$$

where S is a location sensitivity score. As mentioned above, S itself may be a function of the topic, the search query or query terms, the user or user profile, the location associated with the query or a cluster of the search results, or any number of other factors.

Block 214 is followed by block 216, in which search results are provided. The search engine 124 may form the search results 132 from the documents for which a combined relevance score was determined. Using the combined relevance signal from block 214, the search engine 124 may generate a rank or score of the documents located in search results 132. Note that the search engine 124 can use topical signals in conjunction with distance signals to rank or otherwise score documents of search results 132. In some instances, the search engine 124 can further decide whether, and how (e.g., via weighting, etc.) to use a particular distance signal and topical signal during processing of a score or ranking for a search result. Block 216 is followed by block 218, in which the method 200 ends.

Modifications and variations are possible in light of the above teachings or may be acquired from practice of the invention. For example, certain of the acts described with respect to FIG. 2 may be performed in parallel or in a different order. As another example, location sensitivity may be directly incorporated into the combined relevance score, rather than in the distance score, and indeed the topical relevance and distance measures may be directly combined into a combined relevance score without the need for separate topical scores and distance scores. In one implementation, a topical score may be employed to determine an initial set of (ordered) search results, and the distance score may subsequently be employed to "re-rank" the initial set of results, or vice versa.

Furthermore, the implementations described herein have been described in the context of an internet search engine returning more relevant search results to a user search query. However, it will be recognized that systems and methods consistent with the principles of the present invention are also applicable to determining and serving more relevant advertisements by taking into account geographic location. Such advertisements may be of many forms and types, and may be ordered in various manners, as disclosed, for example, in U.S. patent application Ser. No. 10/445,376, entitled "SCORING, MODIFYING SCORES OF, AND/OR FILTERING ADVERTISEMENTS USING ADVERTISER INFORMATION," filed on May 23, 2003, the disclosure of which is hereby incorporated by reference.

Furthermore, it will be appreciated that consistent with the principles of the invention, a search query is not necessary for performance of the methods described herein. Instead, the concept or topic of a document (e.g., a web page) may be used to determine other documents that may be ordered or ranked according to the principles described herein. Such concepts or topics of a document may be determined according to the methods disclosed in, for example, U.S. patent application Ser. No. 10/389,688, entitled "SUGGESTING AND/OR PROVIDING AD SERVING CONSTRAINT INFORMATION," filed on Mar. 14, 2003, U.S. patent application Ser. No. 10/375,900, entitled "SERVING ADVERTISEMENTS BASED ON CONTENT," filed on Feb. 26, 2003, U.S. patent application Ser. No. 10/314,427, entitled "METHODS AND APPARATUS FOR SERVING RELEVANT ADVERTISEMENTS," filed on Dec. 6, 2002, and U.S. Provisional Application Ser. No. 60/413,536, entitled "METHODS AND APPARATUS FOR SERVING RELEVANT ADVERTISEMENTS," filed on Sep. 24, 2002, each of which is hereby incorporated herein by reference.

For example, a technique may be used to analyze a target document to identify one or more topics or concepts for the target document and a location associated with the target document, identify targeting information for a number of advertisements, and compare the targeting information to the topics or concepts to identify a set of potential advertisements. The technique may further be used to determine a distance score for at least one advertisement in the set of potential advertisements using an advertiser location associated with the one advertisement and the location associated with the target document, and order the set of potential advertisements based, at least in part, on the distance score of the at least one advertisement. At least some of the ordered set of potential advertisements may then be presented in accordance with the target document.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code—it being understood that a person of ordinary skill in the art would be able to design software and control hardware to implement the aspects based on the description herein.

While the above description of preferred implementations of the invention provides illustration and description, it is not intended to be exhaustive or to limit the invention to the precise form disclosed.

That which is claimed is:

1. A method performed by a server device, the method comprising:
    receiving, by one or more processors of the server device, a query;
    determining, by one or more processors of the server device, a geographic location associated with the query;
    determining, by one or more processors of the server device, a topic corresponding to the query;
    determining, by one or more processors of the server device, a location sensitivity factor associated with the topic;
    identifying, by one or more processors of the server device, a set of documents based, at least in part, on the query;
    determining, by one or more processors of the server device, for each document in the set of documents, a topical score based, at least in part, on the query;
    determining, by one or more processors of the server device, for each document in the set of documents, a distance score based on a measure of distance between a geographic location associated with the document and the geographic location associated with the query, and on the location sensitivity factor;
    generating, by one or more processors of the server device, for each document in the set of documents, a combined score based, at least in part, on the topical score and the distance score for the document; and
    ordering, by one or more processors of the server device, the set of documents based, at least in part, on the combined scores for the set of documents.

2. The method of claim 1, where the topical score, for a particular document in the set of documents, is an increasing function of a relevance of the particular document with regard to the query.

3. The method of claim 1, where the distance score, for a particular document in the set of documents, is a decreasing function of the measure of distance for the particular document.

4. The method of claim 1, where the location sensitivity factor differs for different topics with which a query may be associated.

5. The method of claim 1, further comprising:
    assigning a first weight to the topical score, for a particular document in the set of documents, to generate a weighted topical score; and
    assigning a second weight to the distance score, for the particular document, to generate a weighted distance score;
    where generating the combined score includes calculating the combined score for the particular document based, at least in part, on the weighted topical score and the weighted distance score.

6. The method of claim 5, where the first weight differs from the second weight.

7. The method of claim 5, where the first weight and the second weight are based, at least in part, on the topic.

8. The method of claim 5, where the first weight and the second weight are based, at least in part, on a keyword included in the query.

9. The method of claim 1, where determining the distance score includes:
    calculating a straight-line distance between the geographic location, associated with a particular document in the set of documents, and the geographic location, associated with the query, and
    calculating the distance score, for the particular document, based, at least in part, on the straight-line distance.

10. The method of claim 1, where determining the distance score includes:
    calculating a driving distance between the geographic location, associated with a particular document in the set of documents, and the geographic location, associated with the query, and
    calculating the distance score, for the particular document, based, at least in part, on the driving distance.

11. A system, comprising:
    one or more devices comprising:
        means for receiving a query;
        means for determining a geographic location associated with the query;
        means for determining a topic associated with the query;
        means for determining a location sensitivity factor associated with the topic;
        means for identifying a plurality of documents based, at least in part, on the query;
        means for determining a topical score for a particular document, of the plurality of documents, based, at least in part, on the query;
        means for determining a distance score for the particular document based, at least in part, on a measure of distance between a location associated with the document and the geographic location associated with the query, and on the location sensitivity factor;
        means for generating a score for the particular document based, at least in part, on the topical score and the distance score; and
        means for ranking the particular document among the plurality of documents based, at least in part, on the score.

12. A server device, comprising:
a processor to implement:
    a document locator to:
        receive a search query, and
        identify a set of documents based, at least in part, on the search query;
    a location component to:
        determine a geographic location associated with the search query,
        determine a topic associated with the search query, and
        determine a location sensitivity factor associated with the topic, where the location sensitivity factor differs for different topics; and
    a ranking component to:
        determine a topical score for each document, in the set of documents, based, at least in part, on the search query,
        determine a distance score for each document in the set of documents based, at least in part, on a measure of distance between a location associated with the document and the geographic location associated with the search query, and on the location sensitivity factor,
        compute a score for each document in the set of documents based, at least in part, on the topical score and the distance score,
        rank each document within the set of documents, based, at least in part, on the score for the document, to generate a ranked set of documents, and
        provide information regarding the ranked set of documents in response to the search query.

13. The server device of claim 12, where the topical score is an increasing function of a relevance of the particular document with regard to the search query.

14. The server device of claim 12, where the distance score is a decreasing function of the measure of distance for the particular document.

15. The server device of claim 12, where, when determining the distance score, the ranking component is configured to:
    calculate a straight-line distance between a geographic location, associated with the particular document, and the geographic location, associated with the query, and
    calculate the distance score, for the particular document, based, at least in part, on the straight-line distance.

16. The server device of claim 12, where, when determining the distance score, the ranking component is configured to:
    calculate a driving distance between a geographic location, associated with the particular document, and the geographic location, associated with the query, and
    calculate the distance score, for the particular document, based, at least in part, on the driving distance.

17. A storage device containing instructions executable by at least one processor, the executable instructions comprising:
    one or more instructions, which, when executed by the at least one processor, cause the at least one processor to:
        receive a query;
        determine a geographic location associated with the query;
        determine a topic corresponding to the query;
        determine a location sensitivity factor associated with the topic;
        identify a plurality of documents based, at least in part, on the query;
        determine, for a particular document of the plurality of documents, a relevance score based, at least in part, on the query;
        determine a distance score for the particular document based, at least in part, on a measure of distance between a geographic location associated with the particular document and the geographic location associated with the query, and on the location sensitivity factor;
        generate a combined score for the particular document based, at least in part, on the relevance score and the distance score for the particular document;
        rank the particular document, among the plurality of documents, based, at least in part, on the combined score for the particular document, to form a ranked set of documents; and
        provide information regarding the ranked set of documents in response to the query.

18. The storage device of claim 17, where the one or more instructions further cause the at least one processor to:
    assign a first weight to the relevance score, for the particular document, to generate a weighted relevance score; and
    assign a second weight to the distance score, for the particular document, to generate a weighted distance score;
    where the one or more instructions that cause the at least one processor to generate the combined score include one or more instructions to cause the at least one processor to calculate the combined score for the particular document based, at least in part, on the weighted relevance score and the weighted distance score.

19. The storage device of claim 18, where the first weight differs from the second weight.

20. The storage device of claim 18, where the first weight and the second weight are based, at least in part, on the topic.

21. The storage device of claim 18, where the first weight and the second weight are based, at least in part, on a keyword included in the query.

* * * * *